US 12,130,515 B2

(12) United States Patent
Zhou et al.

(10) Patent No.: US 12,130,515 B2
(45) Date of Patent: Oct. 29, 2024

(54) DISPLAY PANEL AND ELECTRONIC DEVICE

(71) Applicant: WUHAN CHINA STAR OPTOELECTRONICS TECHNOLOGY CO., LTD., Wuhan (CN)

(72) Inventors: Zheng Zhou, Wuhan (CN); Suimang Song, Wuhan (CN)

(73) Assignee: WUHAN CHINA STAR OPTOELECTRONICS TECHNOLOGY CO., LTD., Wuhan (CN)

( * ) Notice: Subject to any disclaimer, the term of this patent is extended or adjusted under 35 U.S.C. 154(b) by 0 days.

(21) Appl. No.: 17/613,186

(22) PCT Filed: Sep. 29, 2021

(86) PCT No.: PCT/CN2021/121847
§ 371 (c)(1),
(2) Date: Nov. 22, 2021

(87) PCT Pub. No.: WO2023/039955
PCT Pub. Date: Mar. 23, 2023

(65) Prior Publication Data
US 2024/0045263 A1    Feb. 8, 2024

(30) Foreign Application Priority Data

Sep. 14, 2021 (CN) .......................... 202111074254.4

(51) Int. Cl.
*G02F 1/13357* (2006.01)

(52) U.S. Cl.
CPC .. *G02F 1/133603* (2013.01); *G02F 1/133606* (2013.01); *G02F 1/133608* (2013.01)

(58) Field of Classification Search
None
See application file for complete search history.

(56) References Cited

U.S. PATENT DOCUMENTS

| 2005/0063657 | A1 | 3/2005 | Huang et al. |
| 2014/0009716 | A1 | 1/2014 | Tang |
| 2014/0028948 | A1* | 1/2014 | Hsiao ................ G02F 1/133308 312/223.1 |

(Continued)

FOREIGN PATENT DOCUMENTS

| CN | 201875645 U | * | 6/2011 |
| CN | 202771134 U | | 3/2013 |

(Continued)

*Primary Examiner* — Phu Vu
(74) *Attorney, Agent, or Firm* — The Roy Gross Law Firm, LLC; Roy Gross

(57) ABSTRACT

The present application provides a display panel and an electronic device. The electronic device includes a display panel. The display panel includes a backlight module. The backlight module includes a frame, an optical film group, and a fixing block. Movements of the optical film group can be limited in a thickness direction of the display panel by pressing the fixing block on the optical film group. Therefore, optical films can be fixed, so problems of abnormal noise, displacement, and scratches of the optical films in the display panel adopting a direct-lit mini light-emitting diode (LED) light source are prevented.

20 Claims, 5 Drawing Sheets

(56) References Cited

U.S. PATENT DOCUMENTS

2021/0026058 A1    1/2021   Shi et al.

FOREIGN PATENT DOCUMENTS

| | | | |
|---|---|---|---|
| CN | 204086759 U | | 1/2015 |
| CN | 205174253 U | | 4/2016 |
| CN | 105911755 A | | 8/2016 |
| CN | 206805066 U | | 12/2017 |
| CN | 208834053 U | | 5/2019 |
| CN | 209946593 U | | 1/2020 |
| CN | 210864267 U | | 6/2020 |
| CN | 211857125 U | | 11/2020 |
| CN | 113156704 A | * | 7/2021 |
| CN | 213843708 U | | 7/2021 |
| JP | 2006058484 A | | 3/2006 |

* cited by examiner

DISPLAY PANEL AND ELECTRONIC DEVICE

CROSS REFERENCE TO RELATED APPLICATIONS

This application is a National Phase of PCT Patent Application No. PCT/CN2021/121847 having International filing date of Sep. 29, 2021, which claims the benefit of priority of Chinese Application No. 202111074254.4 filed on Sep. 14, 2021. The contents of the above applications are all incorporated by reference as if fully set forth herein in their entirety.

FIELD OF INVENTION

The present application is related to the field of display technology and specifically to a display panel and an electronic device.

BACKGROUND OF INVENTION

With development of display technology, there are more and more application scenarios for vehicle-mounted liquid crystal display (LCD) panels, and their performance requirements are getting higher and higher. Because a local dimming function has advantages of ultra-high contrast and low power consumption, it is gradually being demanded by car manufacturers. The most advanced vehicle technology currently adopts direct-lit mini light-emitting diode (LED) backlight source to achieve the local dimming function.

Due to relatively strict requirements for a reliability of vehicle-mounted displays, optical films which are not fixed in backlight modules will produce abnormal noise, scratches, displacement, and other problems in vibration tests, thereby affecting display effects of products. A conventional edge-lit backlight source provides a boss on a light guide plate to fix an optical film. However, for a backlight module of a direct-lit backlight source, because of changes in an optical structure, a diffuser plate is adopted instead of a light guide plate, so it is impossible to provide a boss on the diffuser plate to fix an optical film, which leads to a problem that the optical film is easily displaced and scratched.

In summary, current display panels provided with direct-lit backlight modules have the problem that the optical films cannot be fixed normally. Therefore, it is necessary to provide a display panel and an electronic device to solve this defect.

SUMMARY OF INVENTION

The present application provides a display panel and an electronic device to solve a problem that optical films cannot be fixed normally in a current display panel adopting a direct-lit backlight module.

An embodiment of the present application provides a display panel including a backlight module. The backlight module includes:
  a frame;
  an optical film group disposed on the frame; and
  a fixing block, wherein one end of the fixing block is connected to the frame, and the other end of the fixing block is pressed on the optical film group.

According to an embodiment of the present application, the frame includes:
  an inner frame, wherein the optical film group is disposed on the inner frame; and
  an outer frame including a first support portion, wherein the first support portion is aligned with a periphery of the optical film group, and the one end of the fixing block is fixedly connected to a side of the first support portion adjacent to the optical film group.

According to an embodiment of the present application, the side of the first support portion adjacent to the optical film group is defined with a groove, and the one end of the fixing block is fixedly connected to a bottom of the groove.

According to an embodiment of the present application, a gap is formed between a periphery of the fixing block and a wall surface of the groove.

According to an embodiment of the present application, the fixing block is disposed on a middle region of the first support portion in a length direction.

According to an embodiment of the present application, the fixing block includes a first fixing block and a second fixing block, and the first fixing block and the second fixing block are symmetrically arranged with respect to a symmetrical center line of the first support portion.

According to an embodiment of the present application, the inner frame includes a first step surface, and the optical film group is disposed on the first step surface; and
  the first step surface is provided with a positioning column, the optical film group is defined with a positioning hole, and the positioning column penetrates the positioning hole.

According to an embodiment of the present application, the positioning column and the first support portion are aligned in a middle region in a length direction.

According to an embodiment of the present application, the backlight module further includes a diffuser plate, the inner frame includes a second step surface, the second step surface is disposed on a side of the first step surface away from the optical film group, and the diffuser plate is disposed on the second step surface.

According to an embodiment of the present application, the fixing block is aligned with the diffuser plate.

According to an embodiment of the present application, the backlight module further includes a light board, and the frame further includes a bottom backplate; and
  the light board is disposed on the bottom backplate, the inner frame is disposed on a periphery of the light board and fixedly connected to an inner circumferential side, and the outer frame is fixedly connected to an outer circumferential side of the bottom backplate.

According to an embodiment of the present application, a gap is formed between the periphery of the optical film group and an inner wall surface of the bottom backplate.

An embodiment of the present application further provides an electronic device, including a display panel. The display panel includes a backlight module. The backlight module includes:
  a frame;
  an optical film group disposed on the frame; and
  a fixing block, wherein one end of the fixing block is connected to the frame, and the other end of the fixing block is pressed on the optical film group.

According to an embodiment of the present application, the frame includes:
  an inner frame, wherein the optical film group is disposed on the inner frame; and
  an outer frame including a first support portion, wherein the first support portion is aligned with a periphery of the optical film group, and the one end of the fixing block is fixedly connected to a side of the first support portion adjacent to the optical film group.

According to an embodiment of the present application, the side of the first support portion adjacent to the optical film group is defined with a groove, and the one end of the fixing block is fixedly connected to a bottom of the groove.

According to an embodiment of the present application, a gap is formed between a periphery of the fixing block and a wall surface of the groove.

According to an embodiment of the present application, the fixing block is disposed on a middle region of the first support portion in a length direction.

According to an embodiment of the present application, the fixing block includes a first fixing block and a second fixing block, and the first fixing block and the second fixing block are symmetrically arranged with respect to a symmetrical center line of the first support portion.

According to an embodiment of the present application, the inner frame includes a first step surface, and the optical film group is disposed on the first step surface; and the first step surface is provided with a positioning column, the optical film group is defined with a positioning hole, and the positioning column penetrates the positioning hole.

According to an embodiment of the present application, the positioning column and the first support portion are aligned in a middle region in a length direction.

Beneficial effects of the embodiments of the present application are as follows. The present application provides the display panel and the electronic device. The electronic device includes the display panel. The display panel includes the backlight module. The backlight module includes the frame, the optical film group, and the fixing block. The one end of the fixing block is connected to the frame, and the other end of the fixing block is pressed on the optical film group. Movements of the optical film group can be limited in a thickness direction of the display panel by pressing the other end of the fixing block on the optical film group. Therefore, optical films can be fixed, so problems of abnormal noise, displacement, and scratches of the optical film group in the display panel adopting a direct-lit mini light-emitting diode (LED) light source are prevented.

DESCRIPTION OF DRAWINGS

In order to describe technical solutions in the present application or prior art clearly, drawings to be used in the description of embodiments will be described briefly below. Obviously, drawings described below are only for some embodiments of the present application, and other drawings can be obtained by those skilled in the art based on these drawings without creative efforts.

DETAILED DESCRIPTION OF EMBODIMENTS

Figure 1:
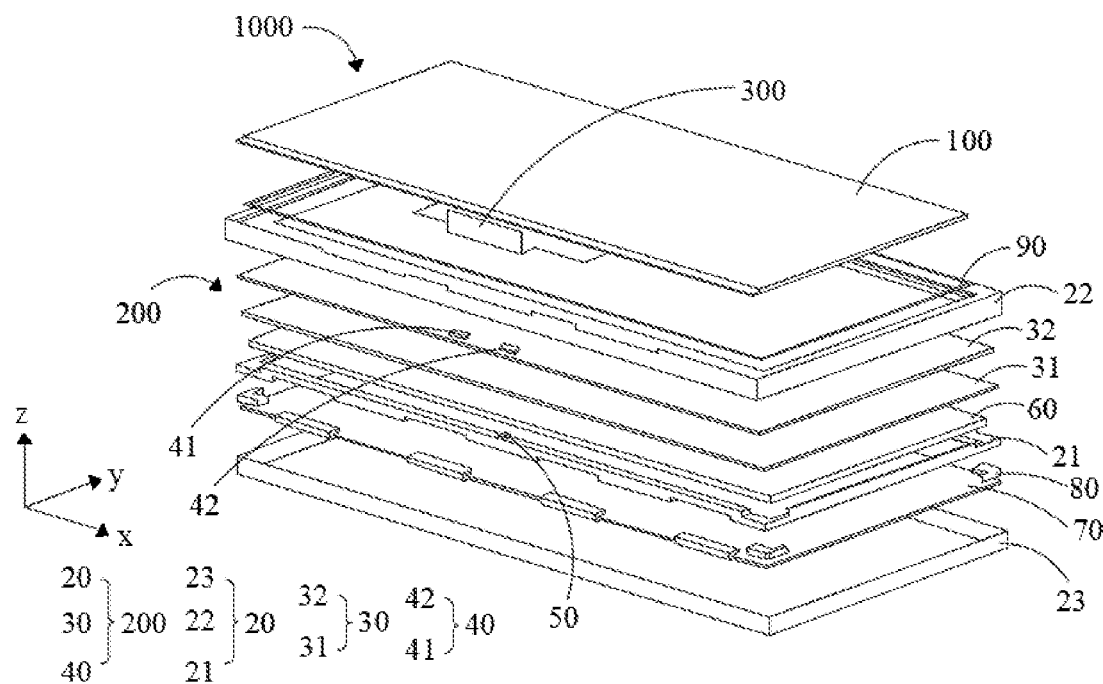
FIG. 1 is an exploded schematic diagram of a display panel provided by an embodiment of the present application.

Examples are described below with reference to the appended drawings, and the drawings illustrate particular embodiments in which the present application may be practiced. Directional terms mentioned in the present application, such as upper, lower, front, rear, left, right, in, out, side, etc., only refer to directions in the accompanying drawings. Thus, the adoption of directional terms is used to describe and understand the present application, but not to limit the present application. In the drawings, units of similar structures are using the same numeral to represent.

The present application will be further described below in conjunction with drawings and specific embodiments.

An embodiment of the present application provides a display panel and an electronic device. The electronic device includes the display panel 1000 and a housing. The display panel 1000 is fixedly disposed in the housing. An accommodating space may be provided in the housing. The accommodating space can be configured to place electronic components required for driving the display panel, such as a motherboard, a printed circuit board, and a battery.

In an embodiment of the present application, the electronic device may be a vehicle-mounted display terminal such as a vehicle-mounted display, a dash camera, and the like. The electronic device may further be a mobile terminal such as a smart phone, a tablet computer, a notebook computer, and the like, or a wearable terminal such as a smart watch, a smart bracelet, smart glasses, an augmented reality device, and the like. The electronic device may further be a fixed terminal such as a desktop computer, a television, and the like, or a vehicle-mounted display terminal such as a vehicle-mounted display or a dash camera.

As shown in FIG. 1, FIG. 1 is an exploded schematic diagram of a display panel provided by an embodiment of the present application, The display panel 1000 includes a display panel main body 100 and a backlight module 200. The display panel main body 100 is disposed on the backlight module 200.

In an embodiment of the present application, the display panel 1000 is a liquid crystal display panel. The display panel main body 100 includes a color filter substrate and an array substrate disposed opposite to each other, and further includes a liquid crystal layer (not shown) disposed between the color filter substrate and the array substrate. The backlight source in the backlight module 200 is a direct-lit backlight source.

Figure 2:
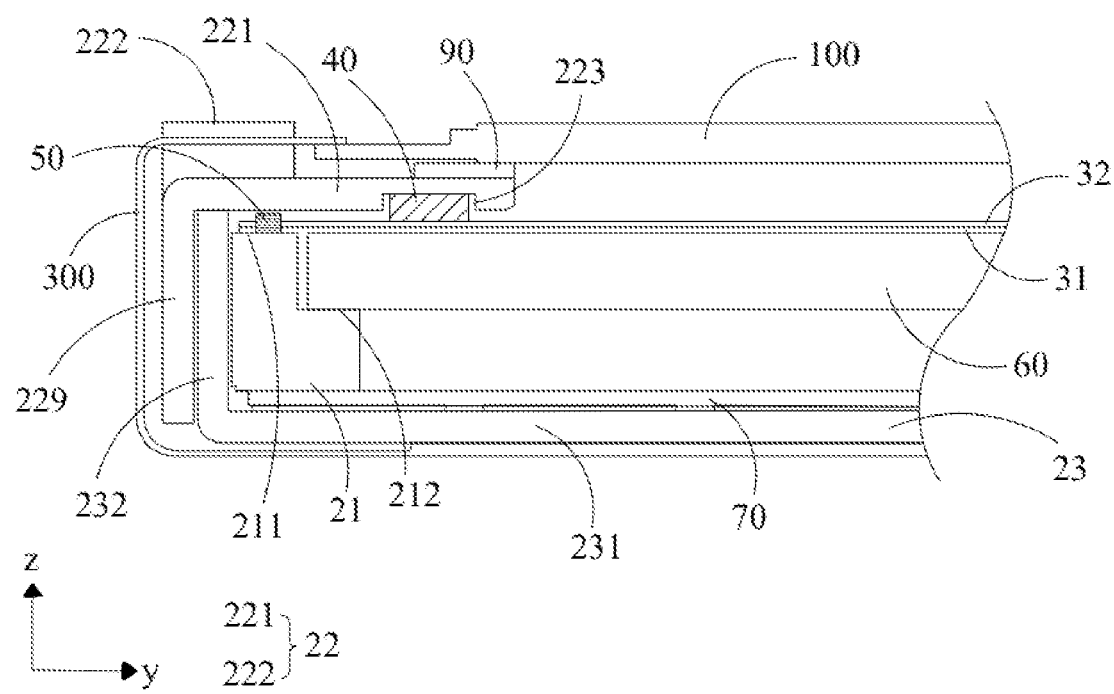
FIG. 2 is a structural schematic diagram of a backlight module provided by an embodiment of the present application.
Figure 3:
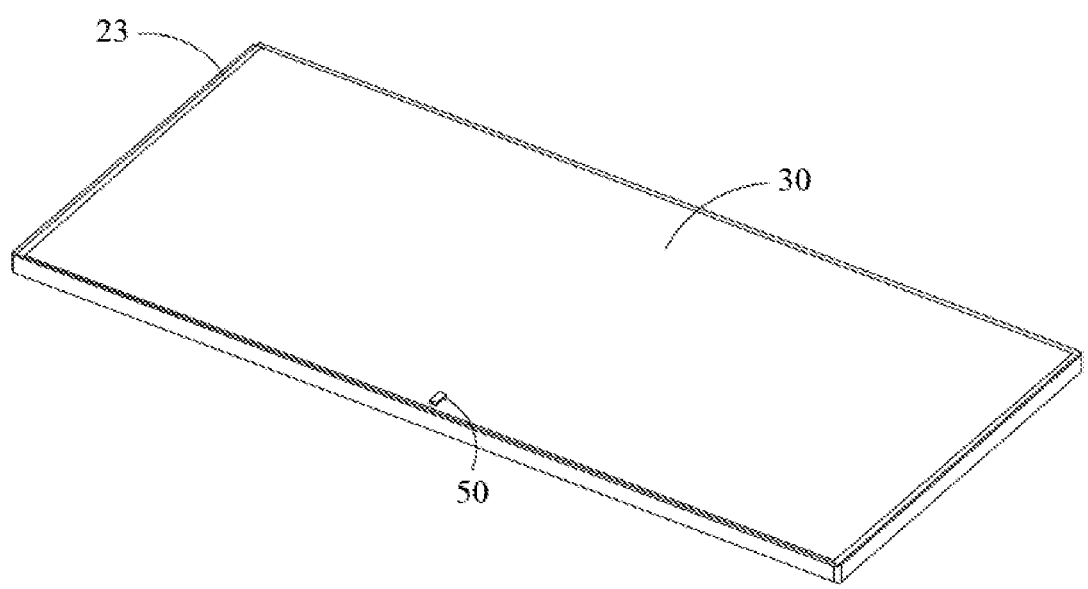
FIG. 3 is a schematic diagram of an assembly of a frame and an optical film group provided by an embodiment of the present application.

Please refer to FIGS. 1 to 3. FIG. 2 is a structural schematic diagram of the backlight module provided by an embodiment of the present application. FIG. 3 is a schematic diagram of an assembly of a frame and an optical film group provided by an embodiment of the present application. The backlight module 200 includes a frame 20, an optical film group 30, and a fixing block 40. The optical film group 30 is disposed on the frame 20.

In an embodiment of the present application, the optical film group 30 includes a lower brightness enhancement film 31 and an upper brightness enhancement film 32 sequentially stacked on the frame 20. In an practical application, the optical films included in the optical film group 30 are not limited to the lower brightness enhancement film 31 and the upper brightness enhancement film 32 in the above embodiments, and may further include, but are not limited to, a privacy film, a diffuser, and the like.

A positioning column 50 is provided on the frame 20. The optical film group 30 is defined with a positioning hole. The positioning hole penetrates each of the optical films in the optical film group 30 in the thickness direction of the display panel 1000, such as the lower brightness enhancement film 31 and the upper brightness enhancement film 32 in this embodiment of the present application. The positioning column 50 on the frame 20 penetrates the positioning hole of the optical film group 30. The optical film group 30 is limited by the positioning column 50, and it cannot move on a plane where the optical film group 30 is positioned (i.e., the plane defined by the x direction and the y direction in the drawing), so as to prevent the optical film group 30 from moving left and right during a vibration process.

One end of the fixing block 40 is connected to the frame 20, and the other end of the fixing block 40 is pressed on the optical film group 30. Limited by a pressure applied by the fixing block 40 to the optical film group 30 opposite to a third direction z, the optical film group 30 cannot move in the thickness direction of the display panel 1000 (i.e., the z direction as shown in the drawing). This prevents the optical film group 30 from moving up and down during the vibration process, so that the optical film group 30 is fixed by a limit fit of the positioning column 50 and the positioning hole and a pressing effect of the fixing block 40. Therefore, the optical film group 30 is prevented from generating abnormal noise, scratching, and displacement during vibration tests, thereby increasing a reliability of the display panel 1000.

Furthermore, the frame 20 includes an inner frame 21. The inner frame 21 includes a first step surface 211. The positioning column 50 is disposed on the first step surface 211. The optical film group 30 is disposed on the first step surface 211.

As shown in FIG. 2, the inner frame 21 is a ring-shaped frame. The inner frame 21 is formed by four linear inner borders connected end to end. A middle portion of the inner frame 21 is a hollow region, and the hollow region can allow light emitted by a light board in the backlight module 200 to pass through. The inner frame 21 is made of an opaque material, which can prevent the light emitted by the light board from being exposed from the inner frame 21. In an embodiment of the present application, the positioning column 50 and the inner frame 21 are integrally formed. In a practical application, the positioning column 50 can further be fixedly connected to the first step surface 211 of the inner frame 21 by gluing, clamping, a screw connection, or welding.

The first step surface 211 is a ring-shaped step surface. The first step surface 211 is aligned with a periphery of the optical film group 30. The first step surface 211 can apply a supporting force along the third direction z to the optical film group 30 to support the optical film group 30.

Furthermore, the frame 20 further includes an outer frame 22. The outer frame 22 is disposed on the inner frame 21. As shown in FIG. 2, the outer frame 22 includes a first support portion 221. The first support portion 221 is parallel to the plane where the optical film group 30 is positioned.

In an embodiment, the outer frame 22 is a ring-shaped frame. The outer frame 22 is formed by four linear borders connected end to end. A middle portion of the outer frame 22 is a hollow region, and the hollow region can also allow the light emitted by the light board to pass through. The outer frame 22 is made of an opaque material, which can prevent the light emitted by the light board from being exposed from the outer frame 22.

The first support portion 221 is aligned with the periphery of the optical film group 30. It can be understood that the first support portion 221 is a ring-shaped structure, and an orthographic projection of the first support portion 221 in the third direction z partially overlaps an orthographic projection of a peripheral edge of the optical film group 30 in the third direction z. The one end of the fixing block 40 is fixedly connected to a side of the first support portion 221 adjacent to the optical film group 30. In this way, the first support portion 221 can be configured to press the fixing block 40, so that the fixing block 40 applies a force opposite to the third direction z to the periphery of the optical film group 30, thereby preventing the optical film group 30 from moving in the third direction z.

In an embodiment of the present application, the fixing block 40 is a single-sided foam adhesive. A side of the fixing block 40 adjacent to the first support portion 221 is sticky. The side of the first support portion 221 adjacent to the optical film group 30 is fixedly connected by gluing. A side of the fixing block 40 adjacent to the optical film group 30 is smooth and non-sticky. It directly contacts the upper brightness enhancement film 32 in the optical film group 30, which can reduce a friction between the fixing block 40 and the optical film group 30, thereby prevent a surface of the optical film group 30 from scratching. When assembling the outer frame 22, the first support portion 221 of the outer frame 22 can be configured to apply a pressure to the single-sided foam adhesive to make the single-sided foam adhesive in a state of compression and deformation. The single-sided foam adhesive can further apply a pressure opposite to a third direction z to the optical film group 30.

Meanwhile, a non-sticky side of the single-sided foam adhesive is in contact with the optical film group 30, so that the optical film group 30 under the fixing block 40 can move relative to the fixing block 40 on the plane where the optical film group 30 is positioned. When the optical film group 30 between the positioning column 50 and the fixing block 40 is heated and expands, the optical film group 30 between the positioning column 50 and the fixing block 40 and the optical film group 30 under the fixing block 40 can expand in a direction away from the positioning column 50. This prevents the optical film group 30 between the fixing block 40 and the positioning column 50 from a wrinkle problem caused by heat expansion of the optical film group 30.

In a practical application, the fixing block 40 is not limited to the single-sided foam adhesive, but can further be replaced by materials with elastic deformation capabilities such as a rubber. In this way, an elastic deformation of the fixing block 40 can be configured to give the optical film group 30 a certain amount of pressure. One side of the fixing block 40 can be attached to the side of the first support portion 221 adjacent to the optical film group 30 by gluing. In a practical application, the fixing block 40 can further be fixedly connected to the first support portion 221 through a snap-fit or a threaded connection.

Furthermore, a groove 223 is defined on the side of the first support portion 221 adjacent to the optical film group 30. One end of the fixing block 40 is fixedly connected to the bottom of the groove 223. The fixing block 40 can be fixedly connected to a bottom of the groove 223 by gluing. The groove 223 can be configured as a positioning mark of the fixing block 40, so that when the backlight module 200 is assembled, it is convenient to assemble the fixing block 40, thereby preventing a position offset of the fixing block 40 to affect a fixing effect of the optical film group 30.

Furthermore, a gap is formed between a periphery of the fixing block 40 and a wall surface of the groove 223.

In an embodiment of the present application, an orthographic projection of the groove 223 on the third direction z is in a shape of a rectangle. A long side of the rectangle is parallel to the second direction y, and a length of the long side is 10 millimeters. A short side of the rectangle is parallel to the first direction x, and a width of the short side is 2 millimeters. An orthographic projection of the fixing block 40 on the third direction z is also in a shape of a rectangle.

A long side of the rectangle is parallel to the second direction y, and a length of the long side is 9.8 millimeters. A short side of the rectangle is parallel to the first direction x, and a width of the short side is 1.8 millimeters. In this way, it can be ensured that a size of the groove 223 is larger than a size of the fixing block 40, and a certain assembly gap of the fixing block 40 is reserved, which facilitates assembling the fixing block 40 into the groove 223. Meanwhile, a certain deformation space is reserved to prevent the first support portion 221 from being deformed by squeezing the first support portion after the fixing block 40 is compressed and deformed.

In a practical application, the length of the long side of the groove 223 is not limited to 10 millimeters, but can also be 11 millimeters, 13 millimeters, or 15 millimeters, etc., and it only needs to range from 10 millimeters to 15 millimeters. The width of the short side of the groove 223 is not limited to 2 millimeters, but can also be 2.3 millimeters, 2.5 millimeters, 2.7 millimeters, or 3 millimeters, etc., and it only needs to range from 2 millimeters to 3 millimeters. The size of the fixing block 40 needs to be 0.2 millimeters smaller than the size of the groove 223 on one side.

In an embodiment of the present application, when a depth of the groove 223 in the third direction z is 0.4 millimeters, and when the fixing block 40 is in an initial state (i.e., non-compressive deformation state), the thickness in the third direction z is 1 millimeter, a distance between the first support portion 221 and the optical film group 30 is 0.3 millimeters, and an interference of the fixing block 40 in the third direction z is 0.3 millimeters. In this way, it can be ensured that after the outer frame 22 is assembled, the fixing block 40 is in a compressed and deformed state, and the pressure applied by the fixing block 40 to the optical film group 30 can limit a movement of the optical film group 30 in the third direction z.

In a practical application, the depth of the groove 223 is not limited to the above-mentioned 0.4 millimeters, and can also be 0.3 millimeters or 0.5 millimeters. The thickness of the fixing block 40 is not limited to the above-mentioned 1 millimeter, and can also be 0.8 millimeters, 0.9 millimeters, 1.1 millimeters, or 1.2 millimeters. The distance between the first support portion 221 and the optical film group 30 is not limited to the above-mentioned 0.3 millimeters, and can also be 0.2 millimeters or 0.4 millimeters. The depth of the groove 223, the thickness of the fixing block 40, and the distance between the first support portion 221 and the optical film group 30 need to satisfy the interference of the fixing block 40 in the third direction z ranging from 0.3 mm to 0.5 mm.

Figure 4:
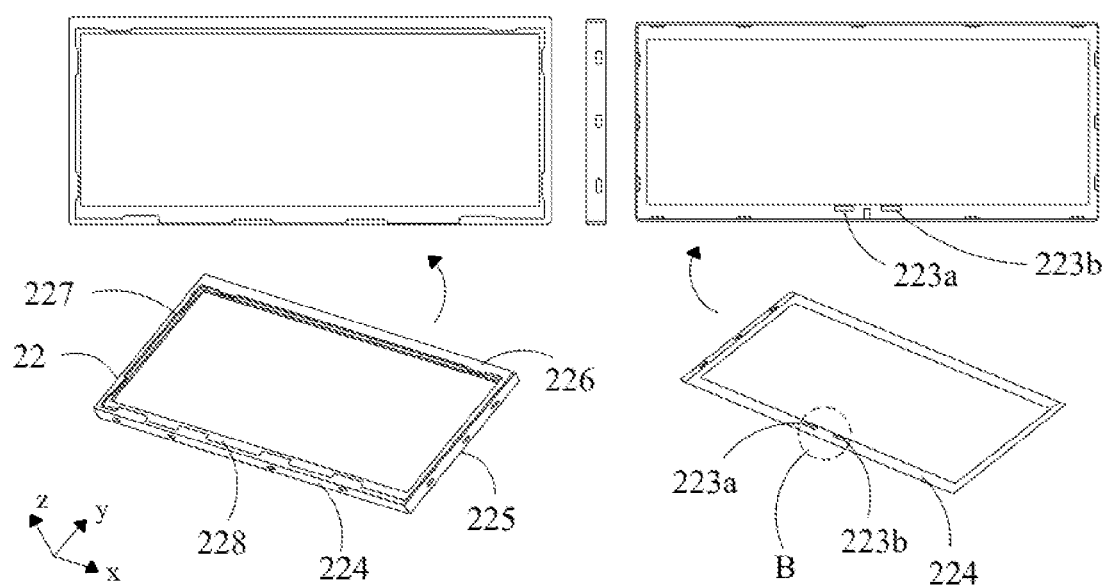
FIG. 4 is a structural schematic diagram of an outer frame provided by an embodiment of the present application.

Furthermore, as shown in FIG. 4, FIG. 4 is a structural schematic diagram of the outer frame provided by an embodiment of the present application. The outer frame 22 includes a first outer frame 224, a second outer frame 225, a third outer frame 226, and a fourth outer frame. 227. The first outer frame 224, the second outer frame 225, the third outer frame 226, and the fourth outer frame 227 are all linear frames. The first outer frame 224, the second outer frame 225, the third outer frame 226, and the fourth outer frame 227 are sequentially connected end to end to form an outer frame 22.

In an embodiment of the present application, the first outer frame 224 and the second outer frame 225 are integrally formed, and the third outer frame 226 and the fourth outer frame 227 are integrally formed, and they both include the first support portion 221. The fixing block 40 is disposed in a middle region of the first support portion 221 of the first outer frame 224 in the length direction. The positioning column 50 is aligned with the first support portion 221 of the first outer frame 224 in a middle region B of the length direction. The length direction of the first support portion 221 is parallel to the first direction x.

Figure 5:
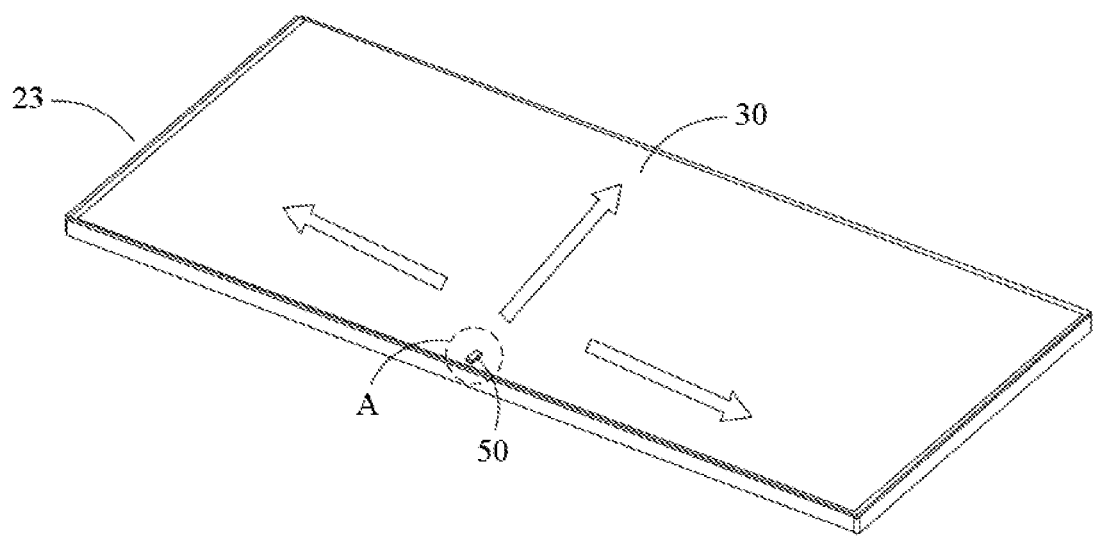
FIG. 5 is a schematic diagram of an expansion of the optical film group provided by an embodiment of the present application.

Please refer to FIGS. 2 to 5. FIG. 5 is a schematic diagram of an expansion of the optical film group provided by an embodiment of the present application. Both the fixing block 40 and the positioning column 50 are aligned with the middle region B of the first support portion 221 of the first outer frame 224. The fixing block 40 and the positioning column 50 constitute a fixed point A, and the fixed point A is positioned in a middle of a side edge of the optical film group 30. Since the optical film group 30 has only one fixed point A as shown in the drawing, the optical film group 30 in other regions does not receive pressure restrictions on the plane where the optical film group 30 is positioned and the third direction z. When the optical film group 30 is heated and expands, an amount of an expansion deformation of the optical film group 30 is centered on the fixed point A and spreads toward two sides and opposite sides of the fixed point A in directions of arrows shown in the drawing. This allows the optical film group 30 to remain flat as a whole, and prevents the wrinkle problem of caused by the concentrated thermal expansion of the optical film group 30.

Furthermore, the fixing block 40 includes a first fixing block 41 and a second fixing block 42. The first fixing block 41 and the second fixing block 42 are symmetrically arranged with respect to a symmetrical center line of the first support portion 221 of the first outer frame 224, and are positioned on an opposite side of the positioning column 50. The symmetrical center line of the first support portion 221 is parallel to the second direction y. The positioning column 50 is disposed on the symmetrical center line.

The groove 223 may include a first groove 223a and a second groove 223b. The first groove 223a and the second groove 223b are both disposed on a side of the first support portion 221 of the first outer frame 224 adjacent to the optical film group 30, and are also positioned on the opposite side of the positioning column 50. One end of the first fixing block 41 is adhered on a bottom of the first groove 223a, and one end of the second fixing block 42 is adhered on a bottom of the second groove 223b. In this way, the first fixing block 41 and the second fixing block 42 can be configured to simultaneously fix and limit the optical film group 30 on two sides of the symmetrical center line of the first support portion 221. Thereby preventing the optical film group 30 from loosening due to an insufficient interference of the fixing block 40 on one side of the symmetrical center line.

Furthermore, as shown in FIG. 2, the display panel further includes a flexible circuit board 300. The display panel main body 100 is disposed on the first support portion 221. The display panel main body 100 is adhered to a side of the first support portion 221 away from the optical film group 30 through a ring-shaped double-sided foam adhesive. The flexible circuit board 300 is connected to the display panel main body 100.

The outer frame 22 includes a second support portion 222. The second support portion 222 is disposed on an outer periphery of the first support portion 221. The second support portion 222 protrudes from the first support portion 221 in the third direction z. A receiving groove 228 is defined on the second support portion 222, and the receiving groove 228 is positioned in a middle region of the second support portion 222 of the first outer frame 224. The flexible circuit board 300 is bent to the back of the backlight module 200 through the receiving groove 228 and passes through an outer side of the outer frame 22.

It can be understood that a width of a border on a side where the flexible circuit board 300 is provided in the display panel 1000 is wider than a width of other side borders. By arranging the receiving groove 228 for receiving the flexible circuit board 300 in the middle region of the second support portion 222 of the first outer frame 224, a width and a space of the original border on the side where the flexible circuit board 300 is provided in the display panel 1000 can be configured to arrange the positioning column 50 and the fixing block 40. This will not increase the width of other borders of the display panel 1000.

Furthermore, as shown in FIG. 2, the backlight module 200 further includes a diffuser plate 60. The inner frame 21 includes a second step surface 212. The second step surface 212 is disposed on a side of the first step surface 211 away from the optical film group 30. The diffuser plate 60 is disposed on the second step surface 212.

A surface of the diffuser plate 60 adjacent to the optical film group 30 is flush with a surface of the first step surface 211, so that the diffuser plate 60 can be configured to support a portion of the optical film group 30 not supported by the first step surface 211, thereby ensuring an overall flatness of the optical film group 30.

The fixing block 40 is aligned with the diffuser plate 60. While the fixing block 40 applies a pressure to the optical film group 30, it can also apply a pressure opposite to the third direction z to the diffuser plate 60. Therefore, the fixing block 40 can play a fixed role on the diffuser plate 60 to prevent the diffuser plate 60 from moving during the vibration process.

In an embodiment of the present application, the backlight source of the backlight module 200 is a direct-lit source, so the diffuser plate 60 needs to be configured to evenly diffuse a light source of the backlight source. A manufacturing process of the diffuser plate 60 is different from that of a current light guide plate. The light guide plate is manufactured by injection molding, so it can be directly formed on a light-emitting surface of the light guide plate to form a boss or a step to fix the optical film group 30 when the light guide plate is formed. However, the diffuser plate 60 is manufactured by cutting and cannot be manufactured by injection molding, so a boss or a step cannot be formed on the diffuser plate 60. By forming the positioning column 50 on the first step surface 211 of the inner frame 21 and matching the fixing block 40 on a side of the first support portion 211 adjacent to the optical film group 30, the optical film group 30 can be fixed without changing an optical structure of a current direct-lit backlight module.

Furthermore, as shown in FIG. 2, the backlight module 200 includes a light board 70. The frame 20 further includes a bottom backplate 23. The light board 70 is disposed on the bottom backplate 23. The inner frame 21 is disposed on a periphery of the light board 70 and fixedly connected to an inner circumferential side of the bottom backplate 23. The outer frame 22 is fixedly connected to an outer circumferential side of the bottom backplate 23. A gap is formed between the second step surface 212 and the light board 70, and the gap is a light-mixing region, which facilitates light emitted by the light board 70 to diffuse to the diffuser plate 60 more uniformly.

Specifically, in an embodiment of the present application, the light board 70 is a mini light-emitting diode (LED) light board, which includes a circuit board and a plurality of mini LEDs arranged on the circuit board in an array distribution. In a practical application, the light board 70 is not limited to the mini LED light board in the above embodiment. The light board 70 can also be an LED light board or a micro LED light board.

The bottom backplate 23 includes a flat bottom plate 231 and a backplate 232 bent along the third direction z by a periphery of the bottom plate 231. The bottom plate 231 and the backplate 232 are integrally formed. The light board 70 is disposed on the bottom plate 231. The inner frame 21 is arranged on a peripheral edge of the light board 70 and is adjacent to the back board 232. The inner frame 21 can be fixedly connected to the bottom plate 231 or the backplate 232 through a snap-fit mechanism. Four corners of the inner frame 21 are further provided with rubber blocks 80. The rubber blocks 80 can be configured for cushioning to prevent the inner frame 21 from shaking during the vibration process, and at the same time, the light board 70 can be protected from being squeezed by an external force to cause the light board 70 to be damaged. The outer frame 22 further includes a third support portion 229 bent in a direction opposite to the third direction z. The outer frame 22 is fixedly connected to the bottom backplate 23 through a snap-fit structure. The third support portion 229 is disposed on an outer circumferential side of the backplate 232. The second support portion 222 and the first support portion 221 are disposed on an upper periphery of the backplate 232.

The backlight module 200 further includes a ring-shaped double-sided foam adhesive 90. The display panel main body 100 is attached to the outer frame 22 of the backlight module 200 through the double-sided foam adhesive 90.

Furthermore, a gap is formed between the optical film group 30 and an inner wall surface of the bottom backplate 23.

As shown in FIG. 2, there is a gap between a peripheral edge of the optical film group 30 and an inner wall surface of the backplate 232. The gap can provide a space for the expansion of the optical film group 30 to prevent the optical film group 30 from generating wrinkles due to the expansion that cannot be released and causing optical defects.

In summary, the present application provides the display panel and the electronic device. The electronic device includes the display panel. The display panel includes the backlight module. The backlight module includes the frame, the optical film group, and the fixing block. The one end of the fixing block is connected to the frame, and the other end of the fixing block is pressed on the optical film group. Movements of the optical film group can be limited in a thickness direction of the display panel by pressing the other end of the fixing block on the optical film group. Therefore, optical films can be fixed, so problems of abnormal noise, displacement, and scratches of the optical film group in the display panel adopting the direct-lit mini LED light source are prevented.

Although the present application has been disclosed above with the preferred embodiments, it is not intended to limit the present application. Persons having ordinary skill in this technical field can still make various alterations and modifications without departing from the scope and spirit of this application. Therefore, the scope of the present application should be defined and protected by the following claims and their equivalents.

What is claimed is:

1. A display panel, comprising a backlight module, wherein the back light module comprises:
   a frame comprising an inner frame and an outer frame, wherein the inner frame is provided with a positioning column, the outer frame comprises a first support portion and a second support portion, the second support portion is disposed on an outer periphery of the first support portion;

an optical film group disposed on the inner frame;

a fixing block, wherein one end of the fixing block is connected to the frame, and the other end of the fixing block is pressed on the optical film group; and a flexible circuit board, wherein a receiving groove is disposed in a region where the second support portion and the positioning column are overlapped, the flexible circuit board is bent to back of the backlight module through the receiving groove and passes through an outer side of the outer frame.

2. The display panel according to claim 1, wherein
the first support portion is aligned with a periphery of the optical film group, and the one end of the fixing block is fixedly connected to a side of the first support portion adjacent to the optical film group.

3. The display panel according to claim 2, wherein the side of the first support portion adjacent to the optical film group is defined with a groove, and the one end of the fixing block is fixedly connected to a bottom of the groove.

4. The display panel according to claim 3, wherein a gap is formed between a periphery of the fixing block and a wall surface of the groove.

5. The display panel according to claim 1, wherein the fixing block is disposed on a middle region of the first support portion in a length direction.

6. The display panel according to claim 5, wherein the fixing block comprises a first fixing block and a second fixing block, and the first fixing block and the second fixing block are symmetrically arranged with respect to a symmetrical center line of the first support portion.

7. The display panel according to claim 1, wherein the inner frame comprises a first step surface, and the optical film group is disposed on the first step surface; and
the first step surface is provided with the positioning column, the optical film group is defined with a positioning hole, and the positioning column penetrates the positioning hole.

8. The display panel according to claim 7, wherein the positioning column and the first support portion are aligned in a middle region in a length direction.

9. The display panel according to claim 7, wherein the backlight module further comprises a diffuser plate, the inner frame comprises a second step surface, the second step surface is disposed on a side of the first step surface away from the optical film group, and the diffuser plate is disposed on the second step surface.

10. The display panel according to claim 9, wherein the fixing block is aligned with the diffuser plate.

11. The display panel according to claim 1, wherein the backlight module further comprises a light board, and the frame further comprises a bottom backplate; and
the light board is disposed on the bottom backplate, the inner frame is disposed on a periphery of the light board and fixedly connected to an inner circumferential side, and the outer frame is fixedly connected to an outer circumferential side of the bottom backplate.

12. The display panel according to claim 11, wherein a gap is formed between the periphery of the optical film group and an inner wall surface of the bottom backplate.

13. A electronic device, comprising a display panel, wherein the display panel comprises a backlight module, and the backlight module comprises:

a frame comprising an inner frame and an outer frame, wherein the inner frame is provided with a positioning column, the outer frame comprises a first support portion and a second support portion, the second support portion is disposed on an outer periphery of the first support portion;

an optical film group disposed on the inner frame;

a fixing block, wherein one end of the fixing block is connected to the frame, and the other end of the fixing block is pressed on the optical film group; and a flexible circuit board, wherein a receiving groove is disposed in a region where the second support portion and the positioning column are overlapped, the flexible circuit board is bent to back of the backlight module through the receiving groove and passes through an outer side of the outer frame.

14. The electronic device according to claim 13, wherein
the first support portion is aligned with a periphery of the optical film group, and the one end of the fixing block is fixedly connected to a side of the first support portion adjacent to the optical film group.

15. The electronic device according to claim 14, wherein the side of the first support portion adjacent to the optical film group is defined with a groove, and the one end of the fixing block is fixedly connected to a bottom of the groove.

16. The electronic device according to claim 15, wherein a gap is formed between a periphery of the fixing block and a wall surface of the groove.

17. The electronic device according to claim 3, wherein the fixing block is disposed on a middle region of the first support portion in a length direction.

18. The electronic device according to claim 17, wherein the fixing block comprises a first fixing block and a second fixing block, and the first fixing block and the second fixing block are symmetrically arranged with respect to a symmetrical center line of the first support portion.

19. The electronic device according to claim 13, wherein the inner frame comprises a first step surface, and the optical film group is disposed on the first step surface; and
the first step surface is provided with the positioning column, the optical film group is defined with a positioning hole, and the positioning column penetrates the positioning hole.

20. The electronic device according to claim 19, wherein the positioning column and the first support portion are aligned in a middle region in a length direction.

* * * * *